Sept. 12, 1967
P. D. HANN
3,341,613
METHOD FOR PRODUCTION OF CYCLOHEXANE BY THE
HYDROGENATION OF BENZENE
Filed Oct. 30, 1964
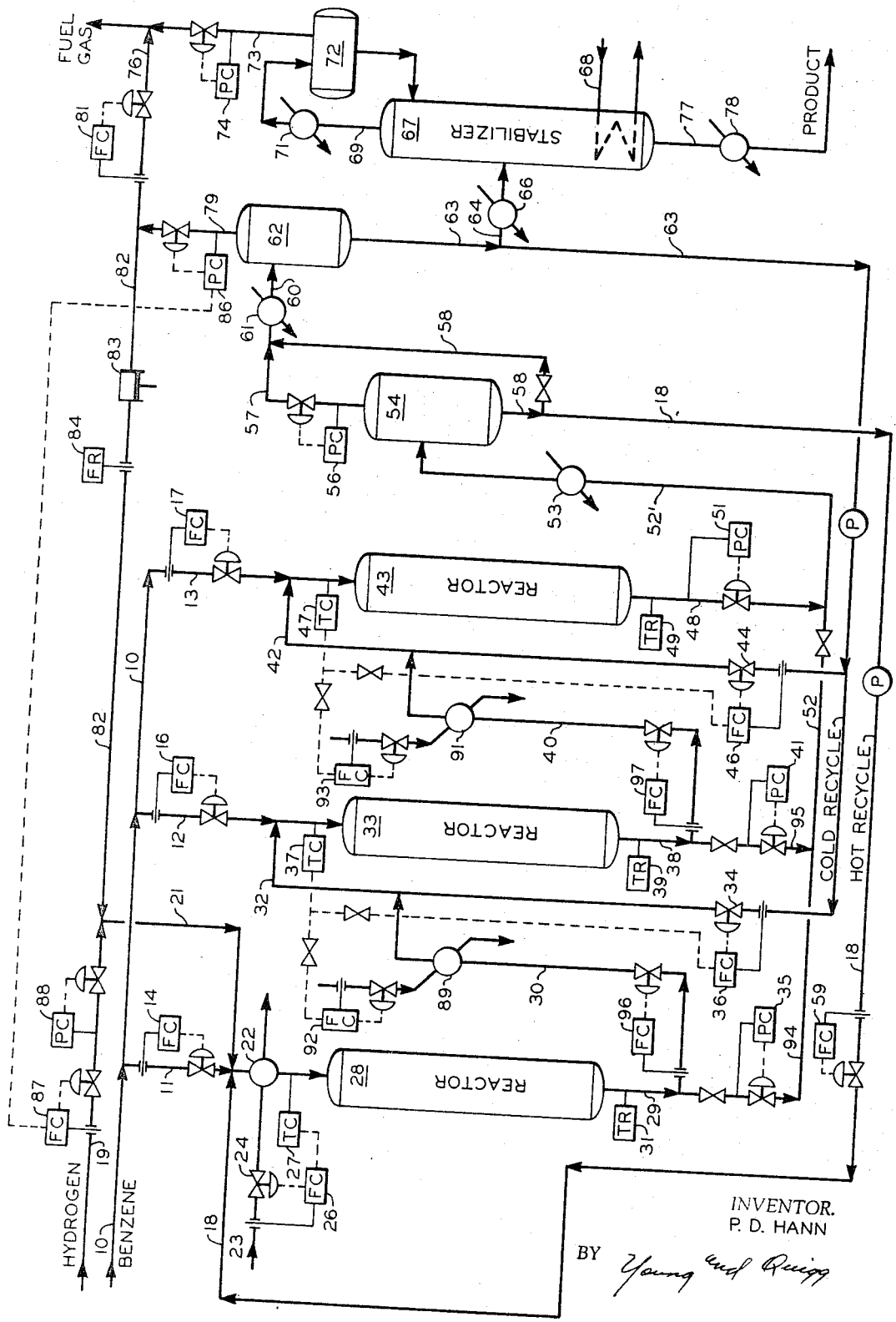
INVENTOR.
P. D. HANN
BY *Young and Quigg*
ATTORNEYS

United States Patent Office 3,341,613
Patented Sept. 12, 1967

3,341,613
METHOD FOR PRODUCTION OF CYCLOHEXANE BY THE HYDROGENATION OF BENZENE
Paul D. Hann, Bartlesville, Okla., assignor to Phillips Petroleum Company, a corporation of Delaware
Filed Oct. 30, 1964, Ser. No. 407,667
10 Claims. (Cl. 260—667)

This invention relates to a method and an apparatus for the production of cyclohexane.

The hydrogenation of benzene to produce cyclohexane is a well known reaction wherein one mol of benzene is reacted with 3 mols of hydrogen in the presence of a suitable hydrogenation catalyst to form one mol of cyclohexane. The reaction is strongly exothermic, liberating 89,500 B.t.u.'s per pound mol of cyclohexane formed. This creates serious problems in carrying out the reaction on a commercial scale. When the operation is carried out adiabatically on a feed stream containing more than relatively small amounts of benzene, the resulting temperature increase on the process stream can be so great that it cannot be tolerated because of equipment limitations and, more seriously, process difficulties such as loss of catalyst activity and the occurrence of side reactions. One side reaction which must be avoided at all costs is a demethylation-hydrogenation reaction which results in runaway temperatures.

In the past, attempts have been made to solve this problem in various ways such as by reducing the concentration of benzene in the feed stream charged to the hydrogenation reactor, reducing the inlet temperature on said feed stream, and by employing reactors provided with elaborate cooling means, either as interstage cooling in systems employing a plurality of reactors or elaborate internal cooling means in systems wherein only one reactor is employed. In some instances, it has been proposed to employ both interstage cooling between reactors and internal cooling means in those systems employing a plurality of reactors. Such complicated cooling means are expensive to buy and maintain and, in general, leave much to be desired. When the concentration of benzene in the feed stream is decreased, there is obviously a decrease in unit capacity. Similarly, when the temperature on the inlet feed stream to the reactor is reduced, there is usually obtained a decrease in efficiency of the process. Thus, few, if any, of the methods employed in the prior art for solving the problem have been entirely satisfactory.

When employing presently known catalysts, the temperature on the inlet feed stream to the hydrogenation zone (initial reaction temperature) should not be less than about 300 to about 400° F. in order to obtain a reasonable reaction rate. In order to prevent the above-mentioned demethylation-hydrogenation reaction and other undesirable side reactions, the temperature on the effluent from the hydrogenation zone (final reaction temperature) should not be greater than about 450 to about 600° F., preferably not greater than about 550° F. Thus, the maximum desirable increase in temperature of the process stream across a reactor is about 300° F., preferably about 150 to 200° F. The process can be operated within the limits of said 300° F. increase in temperature by passing individual portions of the benzene feed stream and individual portions of a cyclohexane diluent stream in parallel into individual reactors of a plurality of reactors, passing all of the hydrogen through said plurality of reactors in series, and regulating the amount of said cyclohexane diluent thus introduced into said reactors to control the temperature therein so that the final reaction temperature in each of said reactors does not exceed about 600° F.

Said method of operating comprising regulating the amount of cyclohexane diluent introduced into each reactor gives good results. In such processes said cyclohexane diluent is conveniently supplied from the product stream from the last reactor after said product stream has been cooled. However, this results in marked inefficiencies with respect to heat utilization because the cyclohexane diluent streams are supplied to all of the reactors at the same temperature. Supplying such a cold diluent is desirable for the succeeding reactors in a group of reactors which are being operated in series because the feed to said succeeding reactors must be cooled as well as diluted. However, a cold diluent stream is not desirable in the first reactor because the feed thereto must be heated as well as diluted.

The present invention solves the above-described difficulties and also provides maximum efficiency with respect to heat utilization. Broadly speaking, the invention accomplishes this by providing a hot diluent stream comprising cyclohexane to the first reactor of the series of reactors and providing a cold diluent stream comprising cyclohexane to the succeeding reactors in the series of reactors. Said hot diluent stream and said cold diluent stream are preferably supplied as recycle streams as described further hereinafter.

An object of this invention is to provide an improved process for the hydrogenation of benzene. Another object of this invention is to provide an improved process for the production of essentially pure cyclohexane by the hydrogenation of essentially pure benzene. Another object of this invention is to provide an improved process for the hydrogenation of benzene wherein maximum efficiency in heat utilization is realized. Still another object of this invention is to provide methods for controlling the temperature in the individual reaction zones of a process for the hydrogenation of benzene to cyclohexane, said process being carried out in a plurality of reaction zones. Another object of this invention is to provide combinations of apparatus for carrying out the hydrogenation of benzene to cyclohexane in a system wherein a plurality of reactors is employed. Other aspects, objects, and advantages of the invention will be apparent to those skilled in the art in view of this disclosure.

Thus, according to the invention, there is provided a process for the production of cyclohexane, which process comprises: contacting a plurality of mixtures of a feed stock comprising benzene, a gas comprising hydrogen, and a diluent comprising cyclohexane with a hydrogenation catalyst under hydrogenating conditions in a corresponding plurality of hydrogenation zones, said hydrogen being passed in series flow through each of said hydrogenation zones from the first to the last, individual streams of said benzene feed stock being passed in parallel into individual hydrogenation zones of said plurality of hydrogenation zones, and individual streams of said cyclohexane diluent being passed in parallel into individual hydrogenation zones of said plurality of hydrogenation zones; withdrawing reaction mixture effluent from each hydrogenation zone of said plurality of hydrogenation zones; passing withdrawn reaction mixture effluent from each said hydrogenation zone, except said last hydrogenation zone, to a succeeding hydrogenation zone; partially cooling said withdrawn reaction mixture from said last hydrogenation zone and passing a portion of same, at substantially initial reaction temperature, to said first hydrogenation zone as the said stream of cyclohexane diluent passed thereto; further cooling the remainder of said withdrawn reaction mixture from said last hydrogenation zone and passing separate portions thereof, at temperatures substantially less than said initial reaction temperature, to said succeeding hydrogenation zones as the said cyclohexane diluent streams used therein; and recovering cyclohexane product from the remainder of said reaction mixture withdrawn from said last hydrogenation zone.

Further, according to the invention, there are provided improved combinations of apparatus for the hydrogenation of benzene to cyclohexane in a plurality of reactors.

It is to be noted that the cyclohexane diluent stream supplied to the first hydrogenation zone or reactor is hot, i.e., the temperature thereof is substantially as great as the initial reaction temperature in said first hydrogenation reactor. It will also be noted that the cyclohexane diluent stream supplied to the succeeding reactors in the series of reactors is cold, i.e., the temperature thereof is substantially less than said initial reaction temperature. By this method of operation the invention provides maximum efficiency in heat utilization. This maximum efficiency is realized because in the practice of this invention unnecessary heating and cooling operations are eliminated. This is not accomplished in the methods of the prior art because the several recycle cyclohexane diluent streams supplied to the various hydrogenation zones or reactors in a series of hydrogenation zones or reactors are all supplied at the same temperature. In the practice of this invention the heat contained in the hot cyclohexane diluent stream supplied to the first reactor in the series of reactors is efficiently utilized to heat the remaining feed to said first reactor by direct heat exchange. In the practice of this invention minimum cooling is effected on the effluent from the final hydrogenation reactor to supply the cyclohexane diluent to the first reactor. This minimum cooling is inexpensive cooling because it is carried out at a high temperature. The much more expensive low temperature cooling is carried out on only a portion of the effluent from the final reactor.

In the practice of at least one preferred embodiment of the invention the only cooling obtained between the plural reaction zones, e.g., between the first and second reactors and between said second and the third reactor, is that which is obtained as the result of the addition of the individual portions of cyclohexane diluent and/or the individual portions of benzene feed stream to the individual reactor effluents before charging same to the succeeding reactor. Said added streams serve to absorb the heat of reaction imparted to the process stream in the preceding reactor. Thus, the elaborate cooling means of the prior art such as intermediate coolers on the process stream between the several reactors and/or elaborate internal cooling means within the reactors can be eliminated, if desired.

The invention is particularly suitable for the hydrogenation of benzene feed streams having a high concentration of benzene, e.g., 90 weight percent or greater. However, benzene feed streams of lower concentration can also be hydrogenated in accordance with the invention. Since the purity of the cyclohexane product is dependent upon the purity of the benzene feed stream, as explained further hereinafter, it is frequently preferred that said benzene feed stream contain at least 99 weight percent benzene, more preferably at least 99.5 weight percent benzene, when a high purity cyclohexane product is desired. The various benzene feed streams which can be employed in the practice of the invention can be obtained from any suitable source. For example, mixtures of hydrocarbons containing from about 20 to about 80 volume percent benzene can be obtained from various petroleum refinery operations. Such mixtures of hydrocarbons contain hydrocarbons having boiling points close to the boiling point of benzene, e.g.,

| | °F. |
|---|---|
| Methylcyclopentane | 161.3 |
| 2,2-dimethylpentane | 174.5 |
| Benzene | 176.2 |
| 2,4-dimethylpentane | 176.9 |
| Cyclohexane | 177.3 |
| 3,3-dimethylpentane | 186.9 |
| 2,3-dimethylpentane | 193.6 |

Such mixtures can be used as the benzene feed stream and the cyclohexane product recovered in concentrated form from the reactor effluent by distillation. If desired, depending upon the equipment available and the integration of the hydrogenation process with other refinery operations, such a feed mixture can be concentrated with respect to the benzene before being charged to the hydrogenation unit. However, because of the presence of the hydrocarbons having boiling points close to the boiling point of benzene, it is not possible to concentrate either the benzene containing feed stream or the cyclohexane product stream sufficient to produce a high purity cyclohexane, e.g., 99.0 weight percent, preferably 99.5 weight percent, cyclohexane which is desired for some uses, such as in the manufacture of nylon. In other words, if there is an appreciable mount of other hydrocarbons such as those named above having boiling points close to the boiling point of benzene, said hydrocarbons will be present in the cyclohexane product when the only means of separation employed is distillation.

However, processes are available whereby high purity benzene can be recovered from petroleum fractions. This can be done on a commercial scale by a combination of distillation and extraction techniques. In such a process a hydrocarbon fraction is separated which contains benzene and other hydrocarbons boiling in the benzene range. This fraction can be taken so that benzene is the only aromatic compound present. The benzene-containing fraction is then subjected to solvent extraction using a suitable solvent which is highly selective for aromatics and will selectively extracts the benzene, leaving the other hydrocarbons. The benzene thus extracted is readily recovered from the solvent by distillation. Benzene obtained by such methods is essentially pure having a benzene content of at least 99.0, usually 99.5, weight percent or higher. It is also within the scope of the invention to employ high purity benzene from other sources.

Since a wide variety of catalysts can be employed in the practice of the invention, it is not intended to limit the invention to any particular catalyst. Any suitable hydrogenation catalyst can be employed. Catalysts suitable for use in the practice of the invention are those which are capable of causing the hydrogenation of benzene to cyclohexane. Examples of such catalysts include, among others, the following: nickel, platinum, palladium, iron, Raney nickel, etc. These materials are generally finely divided and are composited with a porous support or carrier such as the various forms of alumina, silica, alumina-silica coprecipitate, kieselguhr, diatomaceous earth, magnesia, zirconia, or other inorganic oxides, either alone or in combination. Many forms of such catalysts are available commercially. A presently preferred catalyst for use in the practice of the invention is nickel composited with kieselguhr.

The hydrogen employed in the practice of the invention can be obtained from any suitable source. Said hydrogen can be either electrolytic hydrogen of high purity or can be a hydrogen-containing stream recovered from catalytic reforming operations, or other petroleum refining operations. In order to maintain the catalyst at a high level of activity the hydrogen-containing stream recovered from said reforming or other operations is usually scrubbed with a strong caustic solution or passed through a bed of flake caustic (NaOH) to remove sulfur compounds. It is also preferred to remove the $C_4$ and heavier hydrocarbon materials contained in such streams by contacting the gas stream with a suitable absorbent as in conventional absorption processes.

The following description of the drawing will serve to more fully explain the invention. Said drawing is a diagrammatic flow sheet which illustrates the several embodiments of the invention. It will be understood that many valves, pressure gauges, pumps, etc., not necessary for explaining the invention to those skilled in the art, have been omitted so as to simplify the drawing.

Referring now to said drawing, in one embodiment of the invention a feed stream comprising benzene at a temperature usually within the range of from about 50 to about 150° F. is introduced via conduit 10 and is then divided into three substantially equal portions in reactor inlet conduits 11, 12, and 13, controlled by flow controllers 14, 16, and 17, respectively, operatively connected to the motor valves in said conduits as shown. A hot diluent stream comprising cyclohexane, obtained from a source described hereinafter, and at a temperature usually within the range of from about 275 to about 390° F. is introduced from conduit 18 into said conduit 11. A stream of compressed hydrogen-containing gases, essentially sulfur-free, is introduced via conduit 19, passed into conduit 21 where it can be mixed with a recycle stream of hydrogen-containing gases obtained as described hereinafter, and is then introduced into said conduit 11 where it is mixed with said benzene from conduit 10 and said cyclohexane diluent from conduit 18. The resulting mixture is passed through preheater 22, here shown to be an indirect heat exchanger but which can be any suitable type of heating means, and is therein heated. if necessary, to an initial reaction temperature within the range of from about 300 to about 400° F. The amount of heat exchange medium flowing through conduit 23 to said heater 22 is controlled by means of motor valve 24 actuated by flow controller 26 which in turn is reset by temperature controller 27 responsive to the temperature of the mixture in said conduit 11 at a point therein, preferably just prior to its entry into first reactor 28. It is within the scope of the invention to employ the effluent from the final reactor as heat exchange medium in said heat exchanger 22 to obtain at least a portion of the desired increase in temperature.

The preheated feed mixture in conduit 11 is then introduced into first reactor 28 where it contacts a bed of a suitable catalyst capable of causing the hydrogenation of benzene to cyclohexane. A reaction mixture effluent comprising cyclohexane and hydrogen is withdrawn from said reactor 28 via conduit 29 at a final reaction temperature within the range of from about 450 to about 600° F. Pressure controller 35 is provided to hold a suitable back pressure on said reactor 28. Temperature recorder 31 is provided for recording the temperature of said reactor effluent.

Said reactor effluent in conduit 29 is passed via conduit 30 into conduit 32 wherein it is mixed with a stream of cold diluent comprising cyclohexane and the resulting mixture is then passed into conduit 12 wherein it is mixed with a second portion of the benzene feed stream from said conduit 10. The resulting mixture is then introduced into the top of a second reactor 33 at an initial reaction temperature usually within the range of from about 300 to about 400° F. Said conduits 29, 30, and a portion of conduit 32 thus comprise a transfer conduit means between said reactor 28 and inlet conduit 12 of reactor 33. The cyclohexane diluent stream flowing through said conduit 32, from a source described hereinafter, is a cold stream, i.e., the temperature thereof is within the range of from about 50 to about 150° F. If desired, the amount of cyclohexane diluent flowing through said conduit 32 can be controlled by means of motor valve 34 actuated by flow controller 36 which in turn can be reset by temperature controller 37 responsive to the temperature of the mixture in said conduit 12 at a point therein, preferably just prior to its entry into said reactor 33.

A second reactor effluent having a composition similar to the effluent from said first reactor 28 and comprising cyclohexane and hydrogen is withdrawn from said reactor 33 via conduit 38 at a final reaction temperature within the range of from about 450 to about 600° F. Temperature recorder 39 is provided for recording the temperature of said effluent from reactor 33. Pressure controller 41 is provided to hold a suitable back pressure on said reactor 33 in known manner.

Said reactor effluent in conduit 38 is passed via conduit 40 into conduit 42 wherein it is mixed with a second stream of said cold diluent comprising cyclohexane and the resulting mixture is then passed into conduit 13 where it is mixed with a third portion of the benzene feed from said conduit 10. The resulting mixture is then introduced into the top of a third reactor 43 at an initial reaction temperature within the range of from about 300 to about 400° F. Said conduits 38, 40, and a portion of conduit 42 thus comprise a transfer conduit means between said reactor 33 and inlet conduit 13 of reactor 43. If desired, the amount of said second stream of cold cyclohexane diluent flowing through said conduit 42 can be controlled by means of motor valve 44 actuated by flow controller 46 which in turn can be reset by temperature controller 47 responsive to the temperature of said mixture in conduit 13, preferably just prior to its entry into said reactor 43.

A third reactor effluent having a composition similar to the effluent from said reactors 28 and 33, and comprising a mixture of hydrogen and cyclohexane, is withdrawn from said reactor 43 via conduit 48 at a final reaction temperature within the range of from about 450 to about 600° F. Temperature recorder 49 is provided for recording the temperature of said reactor effluent. Pressure controller 51 and its associated motor valve in said conduit 48 are provided for maintaining a suitable back pressure in said reactor 43.

Said reactor effluent in conduit 48 is passed into header conduit 52, through conduit 52′, and through cooler 53 wherein it is cooled to a temperature usually within the range of from about 275 to less than about 390°, preferably within the range of from 275 to 375° F., more preferably to a temperature just sufficient to liquefy substantially all of the cyclohexane product, and is then introduced into a first flash separator 54 wherein a liquid phase and a gaseous phase are separated. Said flash separator 54 is preferably operated at a pressure within the range of from about 5 to 30, preferably 5 to 10, p.s.i.g less than the pressure maintained in said third or final reactor 43. Pressure controller 56 and its associated motor valve disposed in conduit 57 are provided for maintaining the desired pressure in said separator 54 in known manner.

The liquid phase in flash separator 54 comprises the raw cyclohexane product of the process. Said liquid phase is withdrawn from separator 54 via conduit 58 and a portion thereof passed into said conduit 18 for utilization as the hot cyclohexane diluent introduced into said conduit 11 as previously described. If desired, the amount of said hot cyclohexane diluent flowing through said conduit 18 can be controlled by means of flow controller 59 and its associated motor valve disposed in said conduit 18.

The remainder of said liquid phase in conduit 58 is passed into said conduit 57 wherein it is combined with the gaseous phase from said separator 54. The resulting combined stream is then passed through cooler 61 wherein it is cooled, preferably to a temperature within the range of from about 50 to about 150° F. and is then introduced via conduit 60 into second flash separator 62 wherein a liquid phase and a gaseous phase are separated. The liquid phase in flash separator 62 also comprises the raw cyclohexane product of the process. Said liquid phase is withdrawn from flash separator 62 via conduit 63 and portions thereof, controlled by said flow controllers 36 and 46, are utilized as the cold cyclohexane diluent previously described as flowing through said conduits 32 and 42.

The remainder of said liquid phase in conduit 63 is passed via conduit 64 and preheater 66 wherein it is heated to a temperature within the range of about 200 to about 250° F., and then into cyclohexane stabilizer 67 which can comprise a conventional fractionating column provided with suitable reboiler heating means 68 to oversupply the necessary heat for the operation thereof. Overhead vapors are removed from said stabilizer via conduit 69, passed through condenser 71 wherein a portion is condensed, and then into accumulator 72. The liquid in accumulator 72 is returned to said stabilizer as reflux and serves to maintain reflux conditions therein in known manner. Gases are withdrawn from said accumulator 72 via conduit 73, controlled by pressure controller 72 in known manner, and mixed with other gases (described hereinafter) in conduit 76 for utilization as fuel gas or other use. The stabilized cyclohexane product of the process is withdrawn from stabilizer 67 via conduit 77 and cooler 78 and then passed to storage.

The gaseous phase in second flash separator 62 has a high hydrogen content but may also contain any low boiling hydrocarbons which were originally present in the hydrogen introduced via conduit 19. Said gaseous phase is withdrawn from said separator 62 via conduit 79 and at least a portion thereof is charged from the system via conduit 76 so as to control the accumulation or buildup of "inerts," e.g., methane and ethane. The amount of said gaseous phase so discharged is controlled by flow controller 81 in known manner. At least a portion of the gaseous phase from conduit 79 is passed via conduit 82, compressed in compressor 83, and then combined as recycle hydrogen with the fresh or make-up hydrogen introduced via conduit 19. The amount of said recycle hydrogen flowing through conduit 82 and compressor 83 is recorded in known manner by flow recorder 84. Pressure controller 86, operatively connected into conduit 79 in known manner, and also operatively connected to flow controller 87 and maintains in conduit 19 resets said flow controller 87 and maintains a proper relationship between the amount of make-up or fresh hydrogen from conduit 19 and the amount of recycle hydrogen in conduit 82. Pressure controller 88, operatively connected into conduit 19, maintains a suitable back pressure in said conduit 19.

In another embodiment of the invention, the amount of the cold cyclohexane diluent streams being passed through conduits 32 and 42 can be maintained constant, by means of flow controllers 36 and 46, respectively, instead of varying the flow thereof responsive to temperature controllers 37 and 47, respectively. In this embodiment of the invention, if desired, the temperature of the mixtures entering reactors 33 and 43 via conduits 12 and 13, respectively, can be controlled by controlling the temperature of the reactor effluent streams in conduits 29 and 38. This control can be effected by means of the coolers 89 and 91, respectively, utilizing flow controllers 92 and 93 to control the amount of heat exchange medium flowing through said coolers 89 and 91, respectively. Said flow controllers can be operatively connected to temperature controllers 37 and 47, respectively, which will reset said flow controllers responsive to the temperature of the mixture in conduits 12 and 13, respectively.

In another presently preferred embodiment of the invention, the reactor effluent streams in conduits 29 and 38 are divided and minor portions thereof are passed via branch conduits 94 and 95, respectively, into said header conduit 52. Major portions of said effluents are passed through conduits 30 and 40 and the quantities thereof are controlled by means of flow controllers 96 and 97, respectively, to be substantially constant. It will be noted that in this embodiment of the invention the amounts of benzene being passed to the several reactors via conduits 11, 12, and 13 are maintained substantially equal and constant, and the amounts of cyclohexane diluent being passed to the several reactors via conduits 18, 32, and 42 are maintained substantially equal and constant. Thus, since said major portions of effluent passed through conduits 30 and 40 are controlled so as to be substantially constant, each of the reactors is being operated at substantially the same space velocity in this embodiment of the invention. Adjustment of the temperature of the mixture entering reactor 28 can be controlled in heater 22 as described. Since all the reactors are charging the same substantially constant and equal amounts of benzene, and constant substantially equal volumes of diluent, the temperature increase across each of the reactors is substantially equal, and normally no further control on the temperature rise occurring in said reactors is necessary. If desired, however, the temperature of the mixtures entering reactors 33 and 43 via conduits 12 and 13, respectively, can be controlled by means of coolers 89 and 91, respectively. In the practice of the invention such control normally is not required, and when it is required usually amounts to only a "trim control" making final small adjustments.

The following example will serve to further illustrate the invention.

*Example*

A stream of essentially pure benzene is passed through conduit 10 and divided into essentially equal portions in conduits 11, 12, and 13, which are then passed into reactors 28, 33, and 43, respectively. Hydrogen-containing gas from conduit 21 is introduced into conduit 11. A diluent stream comprising hot recycle cyclohexane product at a temperature of about 335° F. is introduced into said conduit 11 from conduit 18. Heater 22 is utilized to maintain the resulting mixture at an initial reaction temperature of about 350° F. Said mixture is then introduced into reactor 28 wherein it contacts a bed of nickel on kieselguhr catalyst. Said reactor 28 is operated at a pressure of about 460 p.s.i.g. Reaction mixture effluent comprising cyclohexane and hydrogen is withdrawn from said reactor 28 via conduit 29 at a final reaction temperature of about 500° F. A controlled minor portion of said effluent is passed via conduit 94 into conduit 52. A constant quantity major portion of said effluent from reactor 28 is passed via conduits 29 and 30, mixed with a constant amount of cold diluent comprising cyclohexane flowing through conduit 32, and then introduced into conduit 12 where it is mixed with a constant amount of benzene equal to the amount of benzene being passed through said conduit 11. The amount of said cold diluent stream in conduit 32 is an amount which, together with the benzene in conduit 12, will result in the mixture in conduit 12 having an initial reaction temperature of about 350° F., as in reactor 28. Said mixture is then introduced into reactor 33 wherein it contacts a bed of nickel on kieselguhr catalyst like that in reactor 28. Said reactor 33 is operated at a pressure of about 450 p.s.i.g.

Effluent from reactor 33 is withdrawn via conduit 38 and a constant quantity major portion thereof in conduit 40 is mixed with a constant amount of cold cyclohexane diluent flowing through conduit 42, the resulting mixture being introduced into conduit 13 where it is further mixed with a constant amount of benzene equal to the amount of benzene being passed through conduits 11 and 12, and the final mixture introduced into reactor 43. A controlled minor portion of said effluent from reactor 33 is passed via conduit 95 into conduit 52. The stream introduced into reactor 43 contacts a bed of nickel on kieselguhr catalyst like that in reactors 28 and 33. Said reactor 43 is operated at a pressure of about 440 p.s.i.g.

Effluent from reactor 43 is withdrawn via conduit 48, mixed in conduit 52 with the minor portions of reactor effluents from conduits 94 and 95, passed through cooler 53 wherein it is cooled to a temperature of about 335° F., and then introduced into first flash separator 54 which is maintained at a pressure of about 435 p.s.i.g. Separation between liquid and gaseous phase is effected in said separator 54. A portion of the liquid phase withdrawn via conduit 58 is passed via conduit 18 as said hot cyclohexane diluent introduced into reactor 28.

The remainder of the liquid phase, together with the gaseous phase in conduit 57, is passed through cooler 61 where it is cooled to a temperature of about 100° F. and then introduced into second flash separator 62. Liquid phase from said separator 62 is withdrawn via conduit 63 and portions thereof passed via conduits 32 and 42 for utilization as the cold cyclohexane diluent in reactors 33 and 43, respectively. The remainder of said liquid phase in conduit 63 is passed via conduit 64 and heater 66 into stabilizer 67. Stabilized cyclohexane product is withdrawn via conduit 77.

The space velocity in each of the reactors 28, 33, and 43 in the above example is about 3 volumes (liquid basis) of benzene plus cyclohexane per volume of catalyst per hour.

The various other flow rates in the above-described example are given below in Table I where the stream numbers refer to the line or conduit numbers shown in the drawing. In said Table I all flow rates are given in mols per hour. The material balance shown in Table I is for illustrative purposes only. Accordingly, trace or very small quantities of some components in some streams have not been shown for the sake of brevity. For example, the various reactor effluents will contain trace or small quantities of unreacted benzene, and the recycle cyclohexane diluent streams will contain trace or small amounts of hydrogen. Similarly, all hydrogen streams have been considered essentially pure hydrogen.

The amount of hydrogen present in the system is sufficient to provide a mol ratio of hydrogen to benzene within the range of about 4:1 to 50:1, preferably about 9:1 as a minimum.

The average space velocity (liquid basis) in the hydrogenation reactors can vary over a relatively wide range of from about 1 to 8, preferably about 2.5 to 4, volumes of benzene plus cyclohexane diluent per volume of catalyst per hour.

While the invention has been described in terms of employing a plurality of reactors comprising three reactors, it will be understood that said plurality of reactors can be less than three, e.g., two, or more than three, e.g., four, reactors. Modification of the system illustrated in the drawing to employ less than or more than three reactors will be apparent to those skilled in the art in view of this disclosure. For example, if only two reactors are employed outlet conduit 38 would be connected directly to conduit 52 and reactor 43 isolated from the system by means of suitable valves in the various conduits leading to and from said reactor 43, or eliminated entirely. The actual number of reactors employed in a given system will depend upon a number of factors including desired stream

TABLE I

| Component | Stream No. and Composition—Mols per Stream Hour | | | | | | | | | |
|---|---|---|---|---|---|---|---|---|---|---|
| | Reactor 28 | | | | | Reactor 33 | | | | |
| | 18 | 21 | 11 | 29 | 94 | 30 | 32 | 12 | 38 | 95 |
| Hydrogen | | 1,625 | 1,625 | 1,475 | 56.7 | 1,418.3 | | 1,418.3 | 1,268.3 | 48.8 |
| Benzene | | | 50 | | | | | 50.0 | | |
| Cyclohexane | 165 | | 165 | 215 | 8.3 | 206.7 | 165 | 371.7 | 421.7 | 16.2 |
| Total | 165 | 1,625 | 1,840 | 1,690 | 65.0 | 1,625.0 | 165 | 1,840.0 | 1,690.0 | 65.0 |

| Component | Stream No. and Composition—Mols per Stream Hour | | | | | | | | |
|---|---|---|---|---|---|---|---|---|---|
| | Reactor 43 | | | | Product Recovery | | | | |
| | 40 | 42 | 13 | 48 | 52 | 60 | 82 | 77 | 19 |
| Hydrogen | 1,219.5 | | 1,219.5 | 1,069.5 | 1,175 | 1,175 | 1,175 | | 450 |
| Benzene | | | 50.0 | | | | | | |
| Cyclohexane | 405.5 | 165 | 570.5 | 620.5 | 645 | 480 | | 150 | |
| Total | 1,625.0 | 165 | 1,840.0 | 1,690.0 | 1,820 | 1,655 | 1,175 | 150 | 450 |

In the practice of the invention, the operating conditions employed in reactors 28, 33, and 43 can be varied over relatively wide ranges. However, said operating conditions are interrelated and when changing one variable consideration must be given to the effect on other variables. As indicated above, the reaction can be carried out at temperatures within the range of about 300 to about 600° F., preferably about 400 to about 500° F. The maximum desirable increase in temperature on the process stream through any reactor is about 300° F., preferably about 150 to about 200° F. The actual temperature employed in said reactors will depend to some extent on the particular type of catalyst employed. More active catalysts make possible employing lower temperatures.

The pressure employed in said reactors 28, 33, and 43 is preferably from about 300 to about 500 p.s.i.a. Said pressures are not particularly critical. Pressure is employed primarily to increase the concentration or partial pressure of the hydrogen and thus aid the progress and completion of the primary reaction and minimize or eliminate side reactions. Thus, the above preferred pressures are those which have been found particularly suitable from a practical operating standpoint but are in no way critical or limiting upon the broad scope of the invention.

day capacity, purity of benzene feed stock, purity of cyclohexane product desired, amount of hydrogen recycle, amount of cyclohexane diluent recycle, and others. In general, a system employing three reactors as described above has been found to be quite flexible and adapted to accommodate a wide variety of processing conditions.

Also, while the invention has been described in terms of preferably introducing equal amounts of benzene into the individual reactors of the system, it is within the scope of the invention to introduce unequal amounts of benzene into the individual reactors. The amount of benzene introduced into a reactor determines, to a large extent, the amount of exothermic reaction taking place and a measure of temperature control can be obtained by regulating the amount of benzene introduced. However, in general, it has been found that effecting temperature control by regulating only the quantity of benzene introduced into the individual reactors to be less efficient and thus unsatisfactory. Thus, in the preferred embodiment of the invention we prefer to introduce substantially equal amounts of benzene into the individual reactors and introduce an amount of cyclohexane diluent into each reactor which is sufficient to obtain the desired temperature control. For obvious reasons said cyclohexane diluent is preferably supplied as recycled cyclohexane product. However, it is within the scope of the invention to employ cyclohexane of the required purity from any other available source as said diluent.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:
1. A process for the production of cyclohexane, which process comprises, in combination, the steps of:
 (a) dividing a feed stream comprising benzene into a plurality of substantially equal individual portions;
 (b) combining a first said individual portion of said benzene feed stream with an excess of a gas stream comprising hydrogen and with a first stream of a diluent comprising cyclohexane having a temperature within the range of from about 275 to about 390° F., and passing the resulting mixture into a first hydrogenation zone of a corresponding plurality of hydrogenation zones at an initial reaction temperature within the range of from about 300 to about 400° F.;
 (c) in said first hydrogenation zone, forming cyclohexane by reacting benzene and hydrogen under hydrogenation conditions in the presence of a catalyst capable of catalyzing the hydrogenation of benzene;
 (d) withdrawing reaction mixture effluent at an elevated final reaction temperature not exceeding about 600° F. from said first hydrogenation zone;
 (e) combining said effluent with another individual portion of said benzene feed stream and with another stream of a diluent comprising cyclohexane having a temperature within the range of from about 50 to about 150° F., and passing the resulting mixture into a succeeding hydrogenation zone of said plurality of hydrogenation zones at an initial reaction temperature within the range of from about 300 to about 400° F.;
 (f) repeating said steps (c), (d), and (e) for said succeeding hydrogenation zone and any further succeeding hydrogenation zones which succeed said first mentioned succeeding hydrogenation zone except the last hydrogenation zone in said plurality of hydrogenation zones, whereby said individual portion of said benzene feed stream and said individual cyclohexane diluent streams pass through said individual hydrogenation zones of said plurality of hydrogenation zones in parallel and said hydrogen passes through said plurality of hydrogenation zones in series;
 (g) withdrawing hydrogenation zone effluent from said last hydrogenation zone of said plurality of hydrogenation zones at an elevated final reaction temperature within the range of from about 450 to about 600° F.;
 (h) cooling said last mentioned effluent to a temperature within the range of from about 275 to about 390° F. and passing same to a first flash separation zone;
 (i) withdrawing liquid phase from said first flash separation zone and passing a portion of same to said first hydrogenation zone as said first stream of cyclohexane diluent;
 (j) cooling the remainder of said liquid phase withdrawn from said first flash separation zone to a temperature within the range of from about 50 to about 150° F. and passing same to a second flash separation zone;
 (k) withdrawing liquid phase from said second flash separation zone and passing separate portions thereof to said succeeding hydrogenation zones as said cyclohexane diluent streams used therein;
 (l) and recovering cyclohexane product from the remainder of said liquid phase withdrawn from said second flash separation zone.

2. A process for the production of cyclohexane, which process comprises, in combination, the steps of:
 (a) dividing a feed stream comprising benzene into substantially equal first, second, and third portions;
 (b) mixing said first portion of said feed stream with a gas stream comprising hydrogen and with a first stream of a diluent comprising cyclohexane having a temperature within the range of about 275 to about 390° F., and passing the resulting mixture into a first hydrogenation zone at an initial reaction temperature within the range of from about 300 to about 400° F.;
 (c) in said first hydrogenation zone, forming cyclohexane by reacting benzene and hydrogen under hydrogenation conditions in the presence of a catalyst capable of catalyzing the hydrogenation of benzene;
 (d) withdrawing a first effluent comprising hydrogen and cyclohexane from said first hydrogenation zone at an elevated final reaction temperature within the range of from about 450 to about 600° F.;
 (e) passing said first hydrogenation zone effluent into a second hydrogenation zone together with said second portion of said benzene feed stream and with a second stream of a diluent comprising cyclohexane having a temperature within the range of about 50 to about 150° F., the amount of said second stream of cyclohexane diluent being an amount sufficient to reduce the temperature of the combined stream entering said second hydrogenation zone to an initial reaction temperature within the range of from about 300 to about 400° F.;
 (f) in said second hydrogenation zone, forming additional cyclohexane by reacting benzene and hydrogen under hydrogenating conditions in the presence of a catalyst capable of catalyzing the hydrogenation of benzene;
 (g) withdrawing a second hydrogenation zone effluent comprising hydrogen and cyclohexane from said second hydrogenation zone at an elevated final reaction temperature within the range of from about 450 to about 600° F.;
 (h) passing said second hydrogenation zone effluent into a third hydrogenation zone effluent together with said third portion of said benzene feed stream and with a third stream of a diluent comprising cyclohexane having a temperature within the range of about 50 to about 150° F., the amount of said third stream of cyclohexane diluent being an amount sufficient to reduce the temperature of the combined stream entering said third hydrogenation zone to an initial reaction temperature within the range of from about 300 to about 400° F.;
 (i) in said third hydrogenation zone, forming additional cyclohexane by reacting benzene and hydrogen under hydrogenating conditions in the presence of a catalyst capable of catalyzing the hydrogenation of benzene;
 (j) withdrawing a third hydrogenation zone effluent comprising hydrogen and cyclohexane from said third hydrogenation zone at an elevated final reaction temperature within the range of from about 450 to about 600° F.;
 (k) cooling said third hydrogenation zone effluent to a temperature within the range of from about 275 to about 390° F. and passing same to a first flash separation zone;
 (l) withdrawing liquid phase from said first flash separation zone and passing a portion of same to said first hydrogenation zone as said first stream of cyclohexane diluent;
 (m) cooling the remainder of said liquid phase withdrawn from said first flash separation zone to a temperature within the range of from about 50 to about 150° F. and passing same to a second flash separation zone;

(n) withdrawing liquid phase from said second flash separation zone and passing separate portions of same to said second and third hydrogenation zones as said second and third streams of cyclohexane diluent, respectively;

(o) and recovering cyclohexane product from the remainder of said liquid phase from said second flash separation zone.

3. A process for the production of cyclohexane, which process comprises, in combination, the steps of:

(a) dividing a feed stream comprising benzene into substantially equal first, second, and third portions;

(b) mixing said first portion of said feed stream with a gas stream comprising hydrogen and with a first stream of a diluent comprising cyclohexane having a temperature within the range of about 275 to about 390° F., and passing the resulting mixture into a first hydrogenation zone at an initial reaction temperature within the range of from about 300 to about 400° F.;

(c) in said first hydrogenation zone, forming cyclohexane by reacting benzene and hydrogen under hydrogenation conditions in the presence of a catalyst capable of catalyzing the hydrogenation of benzene;

(d) withdrawing a first effluent comprising hydrogen and cyclohexane from said first hydrogenation zone at an elevated final reaction temperature within the range of from about 450 to about 600° F.;

(e) combining said first hydrogenation zone effluent with said second portion of said benzene feed stream and with a second stream of a diluent comprising cyclohexane having a temperature within the range of about 50 to about 150° F., and passing the resulting combined stream into a second hydrogenation zone at an initial reaction temperature within the range of from about 300 to about 400° F.;

(f) in said second hydrogenation zone, forming additional cyclohexane by reacting benzene and hydrogen under hydrogenating conditions in the presence of a catalyst capable of catalyzing the hydrogenation of benzene;

(g) withdrawing a second hydrogenation zone effluent comprising hydrogen and cyclohexane from said second hydrogenation zone at an elevated final reaction temperature within the range of from about 450 to about 600° F.;

(h) combining said second hydrogenation zone effluent with said third portion of said benzene feed stream and with a third stream of a diluent comprising cyclohexane having a temperature within the range of about 50 to about 150° F., and passing the resulting combined stream into a third hydrogenation zone at an initial reaction temperature within the range of from about 300 to about 400° F.;

(i) in said third hydrogenation zone, forming additional cyclohexane by reacting benzene and hydrogen under hydrogenating conditions in the presence of a catalyst capable of catalyzing the hydrogenation of benzene;

(j) withdrawing a third hydrogenation zone effluent comprising hydrogen and cyclohexane from said third hydrogenation zone at an elevated final reaction temperature within the range of from about 450 to about 600° F.;

(k) cooling said third hydrogenation zone effluent to a temperature within the range of from about 275 to less than about 390° F. and passing same to a first flash separation zone;

(l) withdrawing liquid phase from said first flash separation zone and passing a portion of same to said first hydrogenation zone as said first stream of cyclohexane diluent;

(m) cooling the remainder of said liquid phase withdrawn from said first flash separation zone to a temperature within the range of from about 50 to about 150° F. and passing same to a second flash separation zone;

(n) withdrawing liquid phase from said second flash separation zone and passing separate portions of same to said second and third hydrogenation zones as said second and third streams of cyclohexane diluent, respectively;

(o) and recovering cyclohexane product from the remainder of said liquid phase from said second flash separation zone.

4. A process for the production of cyclohexane, which process comprises, in combination, the steps of:

(a) dividing a feed stream comprising benzene into substantially equal first, second, and third portions;

(b) mixing said first portion of said feed stream with a gas stream comprising hydrogen and with a first stream of a diluent comprising cyclohexane having a temperature within the range of about 275 to about 390° F., and passing the resulting mixture into a first hydrogenation zone at an initial reaction temperature within the range of from about 300 to about 400° F.;

(c) in said first hydrogenation zone, forming cyclohexane by reacting benzene and hydrogen under hydrogenation conditions in the presence of a catalyst capable of catalyzing the hydrogenation of benzene;

(d) withdrawing a first effluent comprising hydrogen and cyclohexane from said first hydrogenation zone at an elevated final reaction temperature within the range of from about 450 to about 600° F.;

(e) dividing said first effluent into a major portion and a minor portion;

(f) passing said major portion of said first hydrogenation zone effluent into a second hydrogenation zone together with said second portion of said benzene feed stream and with a second stream of cyclohexane diluent having a temperature within the range of about 50 to about 150° F., the amount of said second stream of cyclohexane diluent being an amount substantially equal to the amount of said first stream of cyclohexane diluent and sufficient to reduce the temperature of the combined stream entering said second hydrogenation zone to an initial reaction temperature within the range of from about 300 to about 400° F.;

(g) in said second hydrogenation zone, forming additional cyclohexane by reacting benzene and hydrogen under hydrogenating conditions in the presence of a catalyst capable of catalyzing the hydrogenation of benzene;

(h) withdrawing a second hydrogenation zone effluent comprising hydrogen and cyclohexane from said second hydrogenation zone at an elevated final reaction temperature within the range of from about 450 to about 600° F.;

(i) dividing said second effluent into a major portion and a minor portion, said major portion being equal in amount to the amount of said major portion of said first hydrgenation zone effluent;

(j) passing said major portion of said second hydrogenation zone effluent into a third hydrogenation zone effluent together with said third portion of said benzene feed stream and with a third stream of cyclohexane diluent having a temperature within the range of about 50 to about 150° F., the amount of said third stream of cyclohexane diluent being an amount substantially equal to the amount of said first stream of cyclohexane diluent and sufficient to reduce the temperature of the combined stream entering said third hydrogenation zone to an initial reaction temperature within the range of from about 300 to about 400° F.;

(k) in said third hydrogenation zone, forming additional cyclohexane by reacting benzene and hydrogen under hydrogenating conditions in the presence of a catalyst capable of catalyzing the hydrogenation of benzene;

(l) withdrawing a third hydrogenation zone effluent comprising hydrogen and cyclohexane from said third hydrogenation zone at an elevated final reaction temperature within the range of from about 450 to about 600° F.;

(m) combining said minor portion of said first hydrogenation zone effluent and said minor portion of said second hydrogenation effluent with said third effluent and cooling the combined stream to a temperature within the range of from about 275 to less than about 390° F. and passing same to a first flash separation zone;

(n) withdrawing liquid phase from said first flash separation zone and passing a portion of same to said first hydrogenation zone as said first stream of cyclohexane diluent;

(o) cooling the remainder of said liquid phase withdrawn from said first flash separation zone to a temperature within the range of from about 50 to about 150° F. and passing same to a second flash separation zone;

(p) withdrawing liquid phase from said second flash separation zone and passing separate portions of same to said second and third hydrogenation zones as said second and third streams of cyclohexane diluent, respectively;

(q) and recovering cyclohexane product from the remainder of said liquid phase from said second flash separation zone.

5. A process for the production of cyclohexane, which process comprises, in combination, the steps of:

(a) dividing a feed stream comprising benzene into substantially equal first and second portions;

(b) mixing said first portion of said feed stream with an excess of a gas stream comprising hydrogen and with a first stream of a diluent comprising cyclohexane having a temperature within the range of about 275 to about 390° F., and passing the resulting mixture into a first hydrogenation zone at an initial reaction temperature within the range of from about 300 to about 400° F.;

(c) in said first hydrogenation zone, forming cyclohexane by reacting benzene and hydrogen under hydrogenation conditions in the presence of a catalyst capable of catalyzing the hydrogenation of benzene;

(d) withdrawing a first effluent comprising hydrogen and cyclohexane from said first hydrogenation zone at an elevated final reaction temperature within the range of from about 450 to about 600° F.;

(e) passing said first hydrogenation zone effluent into a second hydrogenation zone together with said second portion of said benzene feed stream and with a second stream of a diluent comprising cyclohexane having a temperature within the range of about 50 to about 150° F., the amount of said second stream of cyclohexane diluent being an amount sufficient to reduce the temperature of the combined stream entering said second hydrogenation zone to an initial reaction temperature within the range of from about 300 to about 400° F.;

(f) in said second hydrogenation zone, forming additional cyclohexane by reacting benzene and hydrogen under hydrogenating conditions in the presence of a catalyst capable of catalyzing the hydrogenation of benzene;

(g) withdrawing a second hydrogenation zone effluent comprising hydrogen and cyclohexane from said second hydrogenation zone at an elevated final reaction temperature within the range of from about 450 to about 600° F.;

(h) cooling said second effluent to a temperature within the range of from about 275 to about 390° F. and passing same to a first flash separation zone;

(i) withdrawing liquid phase from said first flash separation zone and passing a portion of same to said first hydrogenation zone as said first stream of cyclohexane diluent;

(j) cooling the remainder of said liquid phase withdrawn from said first flash separation zone to a temperature within the range of from about 50 to about 150° F. and passing same to a second flush separation zone;

(k) withdrawing liquid phase from said second flash separation zone and passing a portion thereof to said second hydrogenation zone as said second stream of cyclohexane diluent;

(l) and recovering cyclohexane product from the remainder of said liquid from said second flash separation zone.

6. A process for the production of cyclohexane, which process comprises, in combination, the steps of:

(a) driving a feed stream comprising benzene into substantially equal first and second portions;

(b) mixing said first portion of said feed stream with an excess of a gas stream comprising hydrogen and with a first stream of a diluent comprising cyclohexane having a temperature within the range of about 275 to about 390° F., and passing the resulting mixture into a first hydrogenation zone at an initial reaction temperature within the range of from about 300 to about 400° F.;

(c) in said first hydrogenation zone, forming cyclohexane by reacting benzene and hydrogen under hydrogenation conditions in the presence of a catalyst capable of catalyzing the hydrogenation of benzene;

(d) withdrawing a first effluent comprising hydrogen and cyclohexane from said first hydrogenation zone at an elevated final reaction temperature within the range of from about 450 to about 600° F.;

(e) combining said first hydrogenation zone effluent with said second portion of said benzene feed stream and with a second stream of cyclohexane diluent having a temperature within the range of about 50 to about 150° F., and passing the resulting combined stream into a second hydrogenation zone at an initial reaction temperature within the range of from about 300 to about 400° F.;

(f) in said second hydrogenation zone, forming additional cyclohexane by reacting benzene and hydrogen under hydrogenating conditions in the presence of a catalyst capable of catalyzing the hydrogenation of benzene;

(g) withdrawing a second hydrogenation zone effluent comprising hydrogen and cyclohexane from said second hydrogenation zone at an elevated final reaction temperature within the range of from about 450 to about 600° F.;

(h) cooling said second effluent to a temperature within the range of from about 275 to about 390° F. and passing same to a first flash separation zone;

(i) withdrawing liquid phase from said first flash separation zone and passing a portion of same to said first hydrogenation zone as said first stream of cyclohexane diluent;

(j) cooling the remainder of said liquid phase withdrawn from said first flash separation zone to a temperature within the range of from about 50 to about 150° F. and passing same to a second separation zone;

(k) withdrawing liquid phase from said second flash separation zone and passing a portion thereof to said second hydrogenation zone as said second stream of cyclohexane diluent;

(1) and recovering cyclohexane product from the remainder of said liquid from said second flash separation zone.

7. A process for the production of cyclohexane, which process comprises, in combination, the steps of:
(a) dividing a feed stream comprising benzene into substantially equal first and second portions;
(b) mixing said first portion of said feed stream with an excess of a gas stream comprising hydrogen and with a first stream of a diluent comprising cyclohexane having a temperature within the range of about 275 to about 390° F., and passing the resulting mixture into a first hydrogenation zone at an initial reaction temperature within the range of from about 300 to about 400° F.;
(c) in said first hydrogenation zone, forming cyclohexane by reacting benzene and hydrogen under hydrogenation conditions in the presence of a catalyst capable of catalyzing the hydrogenation of benzene;
(d) withdrawing a first effluent comprising hydrogen and cyclohexane from said first hydrogenation zone at an elevated final reaction temperature within the range of from about 450 to about 600° F.;
(e) dividing said first effluent into a major portion and a minor portion;
(f) passing said major portion of said first hydrogenation zone effluent into a second hydrogenation zone together with said second portion of said benzene feed stream and with a second stream of cyclohexane diluent having a temperautre within the range of about 50 to about 150° F., the amount of said second stream of cyclohexane diluent being an amount substantially equal to the amount of said first stream of cyclohexane diluent and sufficient to reduce the temperature of the combined stream entering said second hydrogenation zone to an initial reaction temperature within the range of from about 300 to about 400° F.;
(g) in said second hydrogenation zone, forming additional cyclohexane by reacting benzene and hydrogen under hydrogenating conditions in the presence of a catalyst capable of catalyzing the hydrogenation of benzene;
(h) withdrawing a second hydrogenation zone effluent comprising hydrogen and cyclohexane from said second hydrogenation zone at an elevated final reaction temperature within the range of from about 450 to about 600° F.;
(i) combining said minor portion of said first hydrogenation zone effluent with said second effluent and cooling the combined stream to a temperature within the range of from about 275 to about 390° F. and passing same to a first flash separation zone;
(j) withdrawing liquid phase from said first flash separation and passing a portion of same to said first hydrogenation zone as said first stream of cyclohexane diluent;
(k) cooling the remainder of said liquid phase withdrawn from said first flash separation zone to a temperature within the range of from about 50 to about 150° F. and passing same to a second flash separation zone;
(l) withdrawing liquid phase from said second flash separation zone and passing a portion thereof to said second hydrogenation zone as said second stream of cyclohexane diluent;
(m) and recovering cyclohexane product from the remainder of said liquid from said second flash separation zone.

8. A process for the production of cyclohexane, which process comprises:
(a) contacting a plurality of mixtures of a feed stock comprising benzene, a gas comprising hydrogen, and a diluent comprising cyclohexane with a hydrogenation catalyst under hydrogenating conditions including an initial reaction temperature in a corresponding plurality of hydrogenation zones, said hydrogen being passed in series flow through each of said hydrogenation zones from the first to the last, individual streams of said benzene feed stock being passed in parallel into individual hydrogenation zones of said plurality of hydrogenation zones, and individual streams of said cyclohexane diluent being passed in parallel into individual hydrogenation zones of said plurality of hydrogenation zones;
(b) withdrawing reaction mixture effluent at an elevated final reaction temperature from each hydrogenation zone of said plurality of hydrogenation zones;
(c) passing withdrawn reaction mixture effluent from each said hydrogenation zone, except said last hydrogenation zone, to a succeeding hydrogenation zone;
(d) partially cooling said withdrawn reaction mixture from said last hydrogenation zone to a temperature just sufficient to condense substantially all of the cyclohexane product therein and passing a portion of same, at substantially said initial reaction temperature, to said first hydrogenation zone as the said stream of cyclohexane diluent passed thereto;
(e) further cooling the remainder of said withdrawn reaction mixture from said last hydrogenation zone to a temperature not greater than about 150° F. and passing separate portions thereof, at temperatures substantially less than said initial reaction temperatures, to said succeeding hydrogenation zones as the said cyclohexane diluent streams used therein;
(f) and recovering cyclohexane product from the remainder of said reaction mixture withdrawn from said last hydrogenation zone.

9. A process for the production of cyclohexane, which process comprises:
(a) contacting a plurality of mixtures of a feed stock comprising benzene, a gas comprising hydrogen, and a diluent comprising cyclohexane with a hydrogenation catalyst under hydrogenating conditions including an initial reaction temperature in a corresponding plurality of hydrogenation zones, said hydrogen being passed in series flow through each of said hydrogenation zones from the first to the last, individual streams of said benzene feed stock being passed in parallel into individual hydrogenation zones of said plurality of hydrogenation zones, and individual streams of said cyclohexane diluent being passed in parallel into individual hydrogenation zones of said plurality of hydrogenation zones;
(b) withdrawing reaction mixture effluent at an elevated final reaction temperature from each hydrogenation zone of said plurality of hydrogenation zones;
(c) passing withdrawn reaction mixture effluent from each said hydrogenation zone, except said last hydrogenation zone, to a succeeding hydrogenation zone;
(d) partially cooling said withdrawn reaction mixture from said last hydrogenation zone to a temperature just sufficient to condense substantially all of the cyclohexane product therein and passing same to a first flash separation zone;
(e) withdrawing liquid phase from said first flash separation zone and passing a portion thereof, at substantially said initial reaction temperature, to said first hydrogenation zone as the said stream of cyclohexane diluent passed thereto;
(f) further cooling the remainder of said liquid phase withdrawn from said first flash separation zone to a temperature not greater than about 150° F. and passing same to a second flash separation zone;

(g) withdrawing liquid phase from said second flash separation zone and passing separate portions thereof at a temperature substantially less than said initial reaction temperature to said succeeding hydrogenation zones as the said cyclohexane diluent streams used therein;

(h) and recovering cyclohexane product from the remainder of said liquid phase withdrawn from said second flash separation zone.

10. A process for the production of cyclohexane, which process comprises:

(a) contacting a plurality of mixtures of a feed stock comprising benzene, a gas comprising hydrogen, and a diluent comprising cyclohexane with a hydrogenation catalyst under hydrogenating conditions in a corresponding plurality of hydrogenation zones at an initial reaction temperature within the range of from about 300 to about 400° F., said hydrogen being passed in series flow through each of said contacting zones from the first to the last, substantially equal individual streams of said benzene feed stock being passed in parallel into individual hydrogenation zones of said plurality of hydrogenation zones, and individual streams of said cyclohexane diluent being passed in parallel into individual hydrogenation zones of said plurality of hydrogenation zones;

(b) withdrawing reaction mixture effluent from each of said hydrogenation zones at a temperature within the range of from about 450 to about 600° F.;

(c) passing withdrawn reaction mixture effluent from each said hydrogenation zone, except the last hydrogenation zone, to a succeeding hydrogenation zone;

(d) partially cooling said withdrawn reaction mixture from said last hydrogenation zone to a temperature just sufficient to condense substantially all the cyclohexane product therein and passing same to a first flash separation zone;

(e) withdrawing liquid phase from said first flash separation zone and passing a portion thereof to said first hydrogenation zone as the said stream of cyclohexane diluent passed thereto;

(f) further cooling the remainder of said liquid phase withdrawn from said first flash separation zone to a temperature not greater than 150° F. and passing same to a second flash separation zone;

(g) withdrawing liquid phase from said second flash separation zone and passing separate portions thereof to said succeeding hydrogenation zones as the said cyclohexane diluent streams used therein;

(h) and recovering cyclohexane product from the remainder of said liquid phase withdrawn from said second flash separation zone.

References Cited

UNITED STATES PATENTS

| | | | |
|---|---|---|---|
| 2,833,698 | 5/1958 | Patton et al. | 208—211 |
| 3,228,858 | 1/1966 | Matyear | 260—667 |
| 3,253,047 | 5/1966 | Bellinger | 260—667 |

DELBERT E. GANTZ, *Primary Examiner.*

SAMUEL P. JONES, *Assistant Examiner.*

UNITED STATES PATENT OFFICE
CERTIFICATE OF CORRECTION

Patent No. 3,341,613 September 12, 1967

Paul D. Hann

It is hereby certified that error appears in the above numbered patent requiring correction and that the said Letters Patent should read as corrected below.

Column 11, line 46, for "portion" read -- portions --; column 16, line 22, for "driving" read -- dividing --.

Signed and sealed this 12th day of November 1968.

(SEAL)
Attest:

Edward M. Fletcher, Jr.
Attesting Officer

EDWARD J. BRENNER
Commissioner of Patents